Figure 1:
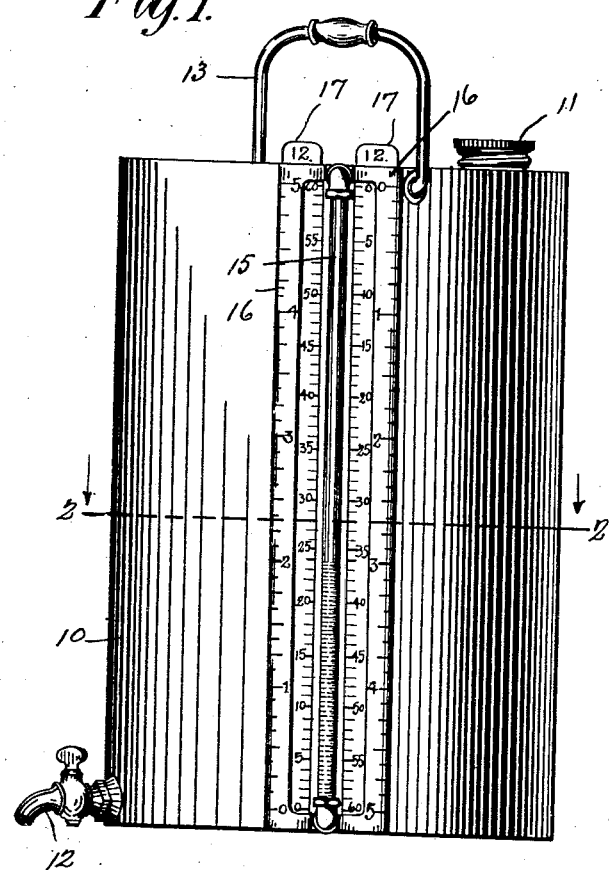

No. 824,532.  
PATENTED JUNE 26, 1906.  
H. F. DUNN.  
PRICE AND MEASURE INDICATOR FOR VESSELS.  
APPLICATION FILED DEC. 24, 1904.

Witness  
W F Bonham  
N. Allemong

Inventor  
Henry F. Dunn.  
By V. H. Lockwood.  
Attorney

UNITED STATES PATENT OFFICE.

HENRY F. DUNN, OF ANDERSON, INDIANA, ASSIGNOR TO S. F. BOWSER AND COMPANY, (INC.,) OF FORT WAYNE, INDIANA, A CORPORATION OF INDIANA.

PRICE AND MEASURE INDICATOR FOR VESSELS.

No. 824,532.      Specification of Letters Patent.      Patented June 26, 1906.

Application filed December 24, 1904. Serial No. 238,238.

*To all whom it may concern:*

Be it known that I, HENRY F. DUNN, of Anderson, county of Madison, and State of Indiana, have invented a certain new and useful Price and Measure Indicator for Vessels; and I do hereby declare that the following is a full, clear, and exact description thereof, reference being had to the accompanying drawings, in which like characters refer to like parts.

The object of this invention is to provide in connection with vessels adapted to contain fluid or other material that will flow means for indicating the quantity and also the price or value of the contents of the vessel and of the contents that has been discharged from the vessel. The device herein shown is specifically employed as a gasolene-can for filling gasolene-tanks in automobiles from large supply-tanks in groceries and the like. Since the quantity of gasolene that may be required to completely fill the automobile gasolene-tank cannot usually be known, and all that the automobile owner wishes is that the tank be filled, and the tank is in the automobile out in the street, it is very tedious to repeatedly fill the ordinary liquid measures with gasolene from the tank in the store and carry it to the automobile in the street and fill the tank of the automobile, and especially to fill it full and have the exact fractional measurement.

In connection with the use just specified the device herein set forth enables the grocer to fill the automobile gasolene-tank at one time and to know exactly how much gasolene he has parted with and exactly what its value is at a given price per gallon. That makes the task an easy and safe one. I have referred to the foregoing use of such device to illustrate one use and advantage of it; but I do not wish to limit said device to any particular use, for there are many occasions besides the one above noted where such a device would be of value and a convenience. I therefore provide in connection with the vessel a gage to indicate the height of the contents of the vessel, and adjacent said gage I provide scales to indicate both the quantity and the price of said contents and also to indicate the quantity that has been withdrawn and the price or value thereof; but I do not wish my patent to be limited to the arrangement herein set forth, as it is only one way of carrying out my invention. The nature of said invention will be understood from the accompanying drawings and the following description and claims.

Figure 3:
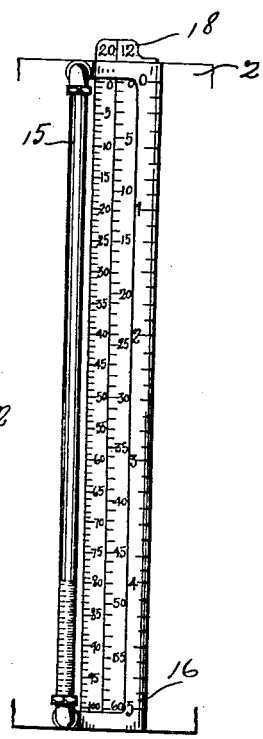
Figure 2:
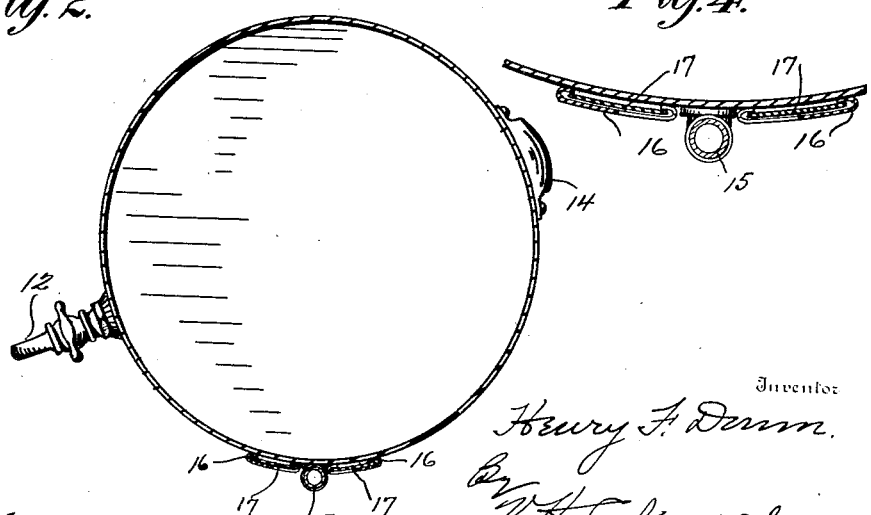
Figure 4:
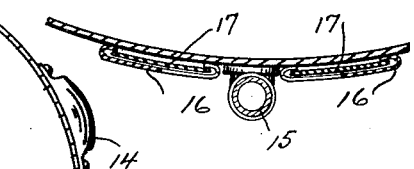

In the drawings, Figure 1 is a side elevation of a vessel provided with my improvement. Fig. 2 is a transverse section on the line 2 2 of Fig. 1. Fig. 3 is an elevation of a modified arrangement of scales. Fig. 4 is a transverse section of the gage, scale, and a portion of the tank on the line 2 2 of Fig. 1, but on an enlarged scale to that shown in Fig. 2.

The construction and arrangement of the device herein set forth to illustrate the general nature of my invention is as follows: 10 represents a vessel, such as a gasolene-tank, 11 being a cap for closing the inlet-opening at the top and 12 being a faucet to use in emptying the same.

A hollow glass gage 15 is provided on one side of the vessel in a vertical position and communicating with the vessel near the top and near the bottom, so that the contents of the vessel will enter the bottom of said gage and rise therein to a level with the contents inside the vessel. Adjacent said gage I provide a vertical metallic scale-holder 16, secured to the side of the vessel. Said scale-holder is cut away vertically and along the front thereof for one-half its width and in the figures herein on the side of the gage for the purpose of disclosing the scale and numerals on the scale-strip 17. Said scale-strip is insertible in said scale-holder and is readily removable therefrom.

The scale-strips 17 are made of thin metallic strips or paper-board or the like and have along the edge thereof marks or graduations in cents and opposite every five-cent mark numerals indicating money, said row of numerals beginning with "0" and increasing five cents at a time to the limit of the scale. On the scale-strips 17 at the left-hand side of the gage in Fig. 1 the value-numerals begin with "0" at the bottom and run to "60" at the top, thus indicating the value of the contents in cents at the rate of twelve cents per gallon, the price per gallon being indicated on the upper end of said scale-strip.

On the scale-strip 17 at the right-hand side of the gage in Fig. 1 the same price-numerals are placed, but in a reverse order, beginning with "0" at the top and running to "60" at the bottom, thus indicating the value in money of the contents that has been discharged from said tank, assuming the same to have been full.

In Fig. 3 I show a modified form of the scale arrangement, there being two scales on one strip 18, one at the right being the same as the scale on the strip at the right of the gage in Fig. 1, indicating the value of the contents at the rate of twelve cents per gallon. On the same scale-strip and adjacent the scale just mentioned there is a scale of prices or value of the contents at the rate of twenty cents per gallon. In other words, in Fig. 3 there is a plurality of price-scales at different rates per gallon. While I have shown scales for the contents at the rates of twelve and twenty cents per gallon, respectively, any number of scales may be employed and at any rates desired. Likewise adjacent said gage, and as herein shown, upon the outer face of the metal guides 16 I place a measure or quantity scale. There are two of these scales in Fig. 1, one on each side of the gage. The one at the left-hand side of the gage indicates the quantity of contents remaining in the vessel and the one at the right-hand side indicates the quantity of the contents that has been removed from the vessel or the capacity of the unfilled portion of the vessel. In the former the numerals representing gallons begin at "0" at the bottom and run to "5" at the top. In the latter said numerals begin at "0" at the top and run to "5" at the bottom. Graduations are placed on the front face of said scale-holders between said numerals to indicate quarts and pints. The same sort of scale that is shown at the right-hand of Fig. 1 is also shown in Fig. 3. I have shown the scales in Fig. 3 on only one side of the gage merely to indicate the principle, but similar scales may be placed on the opposite sides of said gage in Fig. 3 in the same manner as shown in Fig. 1.

From the foregoing it is seen that said scales indicate the quantity of contents remaining in the vessel by pints and the value thereof by cents. Hence one can readily convey an unforseen quantity into a customers tank and determine exactly the quantity and value thereof by looking at said scales. He can also fill the vessels of two or three customers from one of the vessels like that shown in Fig. 1, and know exactly the quantity and value of the contents that he gives to each customer to a pint and to a cent, respectively.

What I claim as my invention, and desire to secure by Letters Patent, is—

1. The combination with a portable vessel, of a transparent gage-tube extending from the bottom to the top thereof and externally visible, and a scale on the vessel at each side of the gage, both scales being price-scales, one being numbered from the top downward and the other from the bottom upward.

2. The combination with a portable vessel, of a transparent gage-tube extending from the bottom to the top thereof and externally visible, two scales secured to the vessel on each side of said gage, making four scales in all, two of said scales being weight-scales and two price-scales, and one of each sort of scales being numbered from the top downward and the other from the bottom upward.

3. The combination with a vessel, of a hollow vertically-disposed transparent gage in communication with the lower end of the vessel, and two scales on each side of said gage, the scales on one side of said gage having numerals numbered from the bottom upward, the numerals on one of said scales indicating the quantity of the contents of the vessel, and the other indicating the money value thereof, and the numerals on the other two scales being numbered from the top downward, the numerals on one of said scales indicating the quantity of the contents of the vessel that has been discharged, and the other indicating the money value thereof.

4. The combination with a vessel, of a hollow vertically-disposed transparent gage in communication with the lower end of the vessel, a guideway secured to the vessel beside said gage that is cut away on one vertical side thereof, and a scale marked on the portion of the guideway that is not cut away, and a scale-strip insertible in said guideway provided with a scale that is visible through the cut-away portion of the guideway.

In witness whereof I have hereunto affixed my signature in the presence of the witnesses herein named.

HENRY F. DUNN.

Witnesses:
V. H. LOCKWOOD,
N. ALLEMONG.